Patented Apr. 12, 1927.

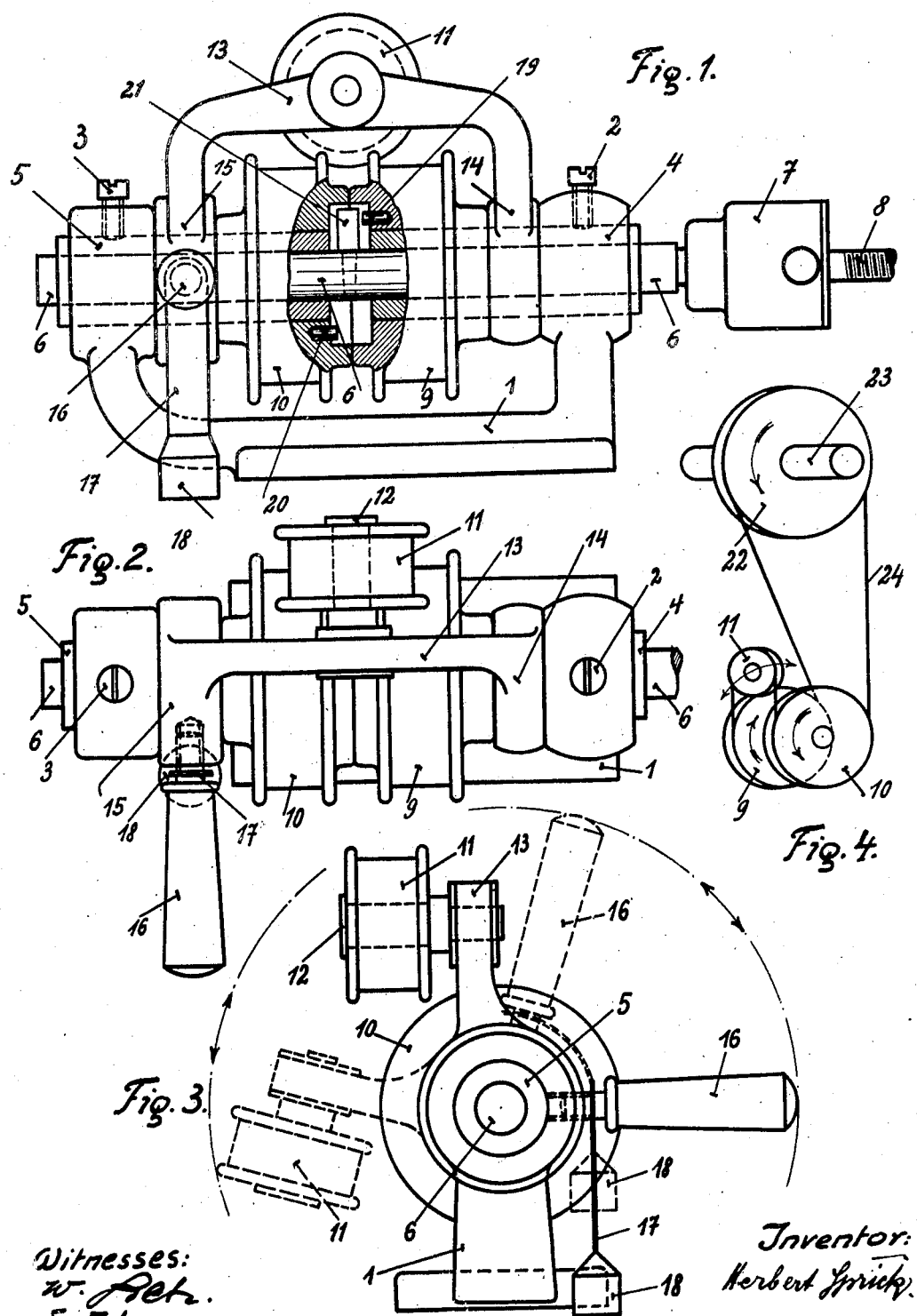

1,624,902

UNITED STATES PATENT OFFICE.

HERBERT SPRICK, OF LEIPZIG, GERMANY.

NUT-TAPPING MACHINE.

Application filed August 5, 1925, Serial No. 48,343, and in Germany August 26, 1924.

Machines, apparatus and devices driven by a belt while a tensioning idler loaded by weight or spring tensions the belt or slackens the same, are already known heretofore.

The hitherto known nut-tapping machines, in which the working-spindle can be reversed, to turn either in clockwise direction or in counter-clockwise direction, by means of a claw- or friction-clutch, have the drawback that the circumferential speed cannot be at once decreased sufficiently when the screw-tap during the cutting action suddenly sticks by overload, settling of shavings or by any other reasons, which results in a strong braking of the circumferential speed of the working-spindle, which again is met by the driving-belt of the machine by its increased adhesion to the belt-pulley. Said increased capacity of the belt causes then frequently a breaking of the screw-tap by the overload. Attempts have been made to avoid said increased capacity of the driving-belt by reversing, at the danger of a breaking of the screw-tap, the rotary direction of the working-spindle, whereby, however, said danger is frequently increased by the shavings stopping the screw-threads, especially in case of the return movement of the working-spindle, as in many machines, taking place at accelerated speed. Consequently, the breakage of screw-taps on such machines is bound to be rather high.

The present invention has for its object to adapt the circumferential speed of the working-spindle to the rotational resistance exerted by the screw-tap on the working-spindle when cutting the screw-threads, in such a way that at the normal cutting action of the screw-tap and thus at its normal rotational resistance acting upon the working-spindle its circumferential speed also remains normal. As soon as, however, the screw-tap exerts an increased rotational resistance on the working-spindle, the circumferential speed of the screw-tap is automatically decreased.

Thus, the invention allows, upon a sticking of the screw-tap, the finishing of the cutting of the screw-threads at decreased circumferential speed because the driving-belt, upon a strong braking of the working-spindle by the screw-tap, automatically diminishes its adhesion to the belt-pulley of the machine.

In the accompanying drawing: Fig. 1 is a front view, partly in section, Fig. 2 is a plan view, and Fig. 3 is a side view, of a machine embodying the improvement, while Fig. 4 illustrates diagrammatically the belt-driving gear of the machine.

In the head-stock 1, the bearing bushes 4, 5 are fixed by means of screws 2, 3. In said bushes, the working-spindle 6 is revolubly mounted and axially movable. With said spindle, the clamping-chuck 7 for holding the screw-tap 8 is firmly connected. On the bearing-bushes 4, 5 the two-belt pulleys 9, 10 are revolubly mounted while a belt tensioning idler 11 is revolubly mounted on a bolt 12 rigidly connected with the turnable yoke 13, which by its arms 14, 15 is fulcrumed on the bearing-bushes 4, 5. The arm 15 of the yoke 13 carries a fixed hand-lever 16 by means of which the yoke 13 can be manually turned on the bearing-bushes 4, 5. Besides, said arm 15 carries by means of a depending ribbon 17 a counter-weight 18.

The coupling of the working-spindle is in the example shown effected by tappets 19, 20 on the driving belt-pulleys 9, 10, either of which tappets engages with a catch 21 on the working-spindle 6 according to whether the latter is axially displaced in one or the other direction.

The operation of the improved arrangement is as follows: From the transmission-shaft 23 the machine is driven by the belt-pulley 22 and the driving-belt 24 in the manner illustrated in Fig. 4. The belt-pulley 9 is then driven in one rotary direction and the belt-pulley 10 in the opposite rotary direction, while the belt stretching pulley 11 leads the belt from the belt-pulley 9 onto the belt-pulley 10. By the different rotary directions of the belt-pulleys 9 and 10 the working-spindle can, in a way known in the art, also be made to run in different rotary directions in that it is together with its catch 21 either pressed against the belt-pulley 10 or pulled against the belt-pulley 9 by reason of the work-piece being moved either toward or away from the screw-tap 8. In the former case, the working-spindle is set in rotation in one direction by engagement of its catch 21 with the tappet 20 of the belt-pulley 10, while in the latter case it is set in rotation in the opposite direction by engagement of its catch 21 with the tappet 19 of the belt-pulley 9. By the counter-weight 18 the yoke 13 is turned on the bearing-bushes 4, 5 until the driving-belt 24 is tensioned. Said tension can be controlled by an increase or a reduction of the weight 18. If then, during cutting of the screw-threads, the screw-tap 8 is exposed to a very strong stress by the belt or by settling of shavings, the braking of the working-spindle resulting therefrom will further tension the pulling belt, which results in the increased pull of the belt turning, by means of the belt-pulley 11, the yoke 13 on the bearing-bushes 4, 5 because the pull of the belt on the yoke 13 has become stronger than the pull of the counter-weight 18 acting in the opposite turnability direction. The turning of the yoke 13 is indicated in Fig. 3, the yoke being able to attain the position shown by dotted lines. By the downward movement of the yoke 13 together with the belt tensioning idler 11 connected therewith, the arc of contact of the driving-belt with the pulleys 9 and 10 is diminished, which again results in the belt, upon a strong braking of the working-spindle by the screw-tap, being unable to exert an increased pulling force on the belt-pulleys 9 and 10 but liable to slip thereon by reason of the reduction of its arc of contact with the belt-pulleys and of its pulling force. The circumferential speed decreased by said slipping permits then of the work-piece being readily cut without breaking of the screw-tap.

As already mentioned, the weight of the counterweight 18 can be increased or reduced according to whether a larger or smaller screw-tap is used. Furthermore, instead of the weight, a spring can be employed, this being obvious without further illustration.

The automatic play of the yoke 13 can also be manually influenced during cutting by means of the hand-lever 16, while furthermore the latter can be connected with a treadle mechanism in a way known in the art, this being also understood without further illustration.

What I claim, is:

1. The combination in a nut-tapping machine, of a revolubly mounted working-spindle, two belt-pulleys revolubly mounted on the latter and adapted to move the same in opposite rotary directions, a rotary belt tensioning idler, a driving-belt guided over said pulleys and idler, a turnable yoke fulcrumed on said spindle and carrying said belt tensioning idler and adapted when turned to change the arc of contact of the belt with said belt-pulleys, and means in connection with said yoke to yieldingly counteract the pulling force of said belt, substantially as and for the purpose set forth.

2. In a nut-tapping machine as specified in claim 1, stationary bearing-bushes intermediate said working-spindle and said yoke and belt-pulleys respectively, substantially as set forth.

3. In a nut-tapping machine as specified in claim 1, a hand-lever on said yoke for a manual operation of the latter, subtantially as set forth.

In testimony whereof I have hereunto set my hand.

HERBERT SPRICK.